United States Patent [19]
Carlnäs et al.

[11] Patent Number: 5,883,997
[45] Date of Patent: Mar. 16, 1999

[54] FIBRE REFLECTOR

[75] Inventors: Torbjörn Carlnäs, Österskär; Göran Ljungqvist, Stockholm; Martin Kull, Vaxholm, all of Sweden

[73] Assignee: Telefonaktiebolaget LM Ericsson, Stockholm, Sweden

[21] Appl. No.: 727,526

[22] PCT Filed: Apr. 24, 1995

[86] PCT No.: PCT/SE95/00459

§ 371 Date: Dec. 13, 1996

§ 102(e) Date: Dec. 13, 1996

[87] PCT Pub. No.: WO95/29414

PCT Pub. Date: Nov. 2, 1995

[30] Foreign Application Priority Data

Apr. 22, 1994 [SE] Sweden ................. 9401373-7

[51] Int. Cl.$^6$ ..................................... G02B 6/16
[52] U.S. Cl. ................. 385/123; 385/31; 385/47; 385/147
[58] Field of Search ................. 385/15, 31, 39, 385/43, 44, 47, 48, 123, 125, 147, 901; 362/32

[56] References Cited

U.S. PATENT DOCUMENTS

| | | | |
|---|---|---|---|
| 4,195,907 | 4/1980 | Zamja et al. | 385/125 |
| 4,351,585 | 9/1982 | Winzer et al. | 385/44 |
| 4,378,143 | 3/1983 | Winzer | 385/44 |
| 4,400,056 | 8/1983 | Cielo | 385/27 |
| 4,892,388 | 1/1990 | Taylor | 385/15 |
| 5,204,924 | 4/1993 | Atherton | 385/43 |
| 5,210,801 | 5/1993 | Fournier et al. | 385/14 |
| 5,359,681 | 10/1994 | Jorgenson et al. | 385/123 X |

FOREIGN PATENT DOCUMENTS

90/06498  6/1990  WIPO .

*Primary Examiner*—John D. Lee
*Attorney, Agent, or Firm*—Burns, Doane, Swecker & Mathis, L.L.P.

[57] ABSTRACT

An air bubble (23) in the core (3) of an optical fiber (1, 1') constitutes a broad band reflector to light waves propagated in the fiber. A fiber end (3) is first stripped and cut in the conventional way, after which in the end surface, a pit (13) in the core region is produced by etching. The fiber end is therefor treated with e.g. diluted hydrofluoric acid, that etches the higher doped core (3) more rapidly than the cladding (5). The etched fiber end (1) is then welded to a standard fiber so that a splice (21) is obtained where the desired air bubble (23) is enclosed in the fiber core. The magnitude of the reflectance of the produced reflector can then be changed by repeated heating steps, in the same way as in welding, of the splice (21) and/or by filling the bubble (23) with another medium than air or by coating one of its walls with a suitable material, e.g. a metal.

35 Claims, 2 Drawing Sheets

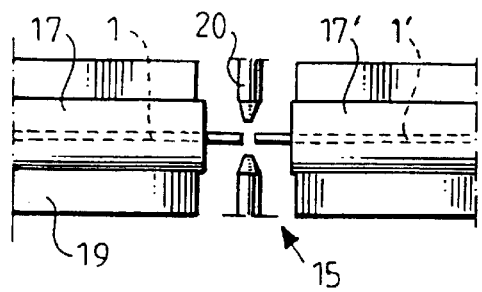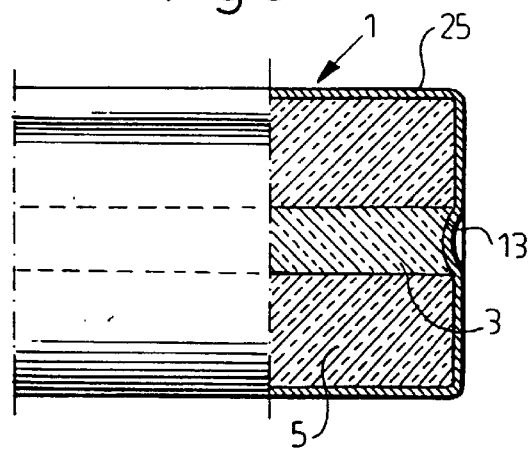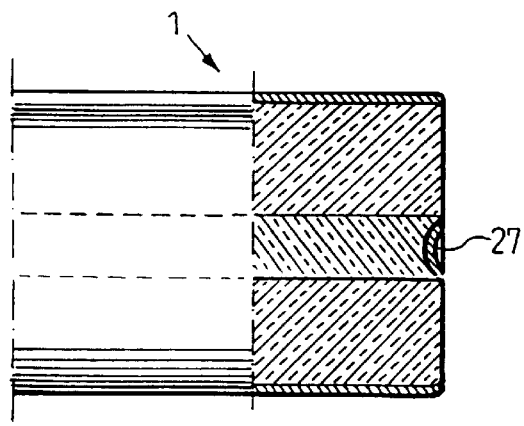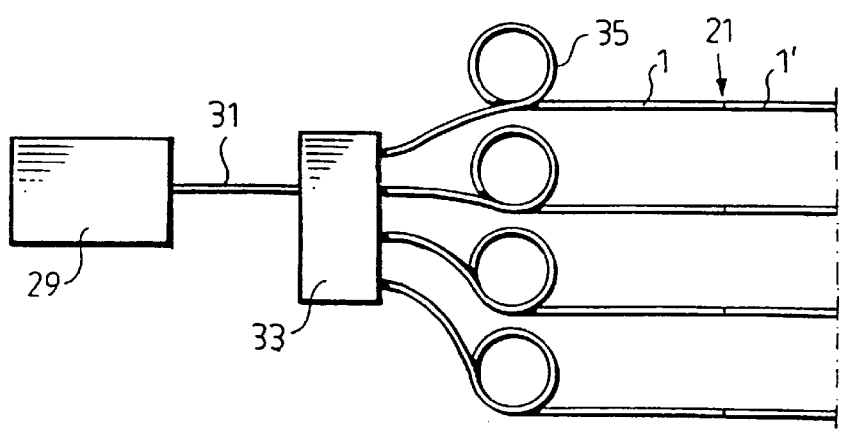

FIBRE REFLECTOR

TECHNICAL FIELD

The present invention relates to a method of producing an optical fibre reflector, a fibre reflector produced by means of the method and a use of the fibre reflector for verifying the function of an optical network.

BACKGROUND

Internal reflections in optical fibres have several applications, such as for sensor purposes and for verifying the function of a fibre optical network. Light transmitted in an optical fibre is reflected at the reflector and the reflected light can be detected.

Optical reflectors for generating internal reflections in optical fibres and methods for producing such reflectors are previously known from U.S. Pat. Nos. 4,892,388 and 4,400, 056. However, the prior methods are rather complicated and there is thus a need for providing simple production methods for reflectors in optical fibres.

In the patent U.S. Pat. No. 5,210,801 optical components are disclosed constructed of flat wave guides or wave guides having rectangular cross-sections, where a cavity is arranged located adjacent a wave guide core, however never so located that the material of the wave guide core is located directly at the cavity. The production of the components is made by means of the conventional, process technological, relatively complicated and costly methods which are used for manufacturing electronic integrated circuits and optical planar circuits.

SUMMARY OF THE INVENTION

It is an object of the invention to provide a simple method for producing internal reflections in optical fibres.

It is also an object of the invention to provide an optical fibre provided with an internal reflector for obtaining internal reflections in the optical fibre.

The objects mentioned above are achieved by the invention, the detailed characteristics of which are described below.

Thus, in a controlled way an air bubble, i.e. a small cavity, which in the main case is filled with air, is introduced in the core of an optical fibre by means of an etching or a welding procedure and thereby a broad band fibre reflector is obtained. The fibre end is first stripped, i.e. its exterior protective layer is removed, and is then cut in the conventional way for achieving an essentially flat end surface, that is located essentially perpendicularly to the longitudinal direction of the fibre end, after which, in the end surface thus formed, a pit or recess is made in the core region, i.e. in the region where the fibre core ends in the end surface. The pit can be produced by means of some mechanical method such as grinding or by treating the end surface with a laser beam for removing material at the suitable position. However, a chemical treatment is preferred, wherein the fibre end is etched with e.g. diluted hydrofluoric acid or a mixture thereof with similar substances such as ammonium fluoride. A recess is thereby produced, since the higher doped core is etched more rapidly than the cladding. The etched fibre end is then joined or spliced, in the preferred case welded, to a standard fibre having, in the preferred case, an essentially flat end surface, which is cut in the usual way and is essentially perpendicularly to the longitudinal direction of this fibre end, which results in an air bubble enclosed in the core. The magnitude of the reflectance can be changed by repeated heating operations in the same way as in welding over the spliced or joint region and/or by filling the bubble with another medium than air or by coating one of its walls with a suitable material, e.g. a metal.

Generally, an optical fibre has a fibre core and a cladding surrounding the core. In order to produce a reflector, a cavity is arranged in the optical fibre, which is in particular arranged in the fibre core. The cavity is generally completely surrounded by material of the fibre and is located so close to the core, that light which is introduced into and propagates along the fibre, will be disturbed significantly by the cavity, so that it is partly reflected. It is obtained by the fact that the fibre core material extends up to the cavity and in particular the cavity can be essentially completely enclosed or completely surrounded by material in the core. For a production according to what has been discussed above the cavity will have substantially a lens-shape or essentially the shape of a flattened ellipsoidal body, having two opposite, large arched or curved surfaces. The fibre core material extends then up to at least the central part of these large surfaces and also to nearly all of these surfaces except possibly a small, exterior marginal area.

In the cavity a substance can be provided that increases the reflective capability of the cavity to light waves propagating in the optical fibre. Such a substance can in particular have a refractive index different from the refractive index of the material surrounding the cavity and the optical fibre or it can be a metal material. The substance can, as for metal materials, have substantially solid form and then be deposited as a layer on only one surface in the cavity, on one of the large surfaces according to what has been said above, or generally only on one surface which is directed towards or is located at the wave guide core or only one surface which is substantially directed in one direction, in the longitudinal direction of the fibre.

BRIEF DESCRIPTION OF THE DRAWINGS

The invention will now be described in more detail with reference to not limiting embodiments and the accompanying drawings in which:

FIG. 4 shows schematically splicing of optical fibres,

FIG. 5 shows a section of a coated end of an optical fibre,

FIG. 6 shows a section of the coated end according to FIG. 5, where the coating has been partly removed, FIG. 7 shows internal reflections in optical fibres used for verifying the function of an optical network.

DETAILED DESCRIPTION

Figure 1:
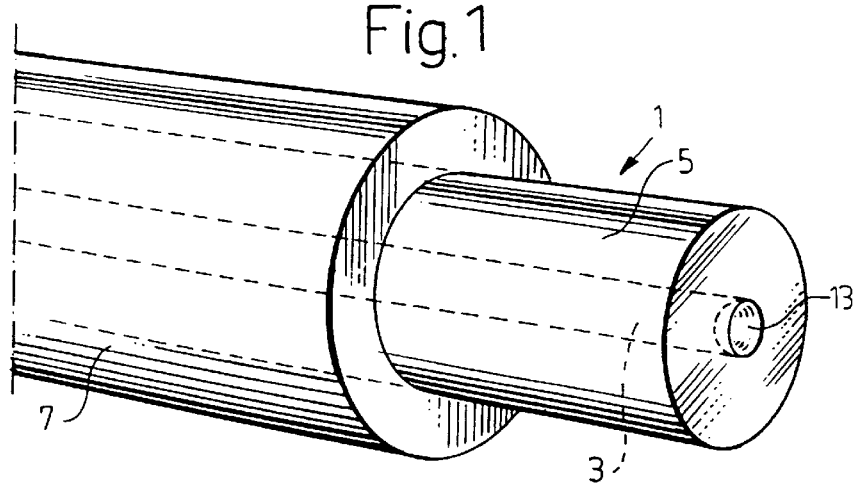
FIG. 1 shows a fibre end having an etched end surface.
Figure 3:
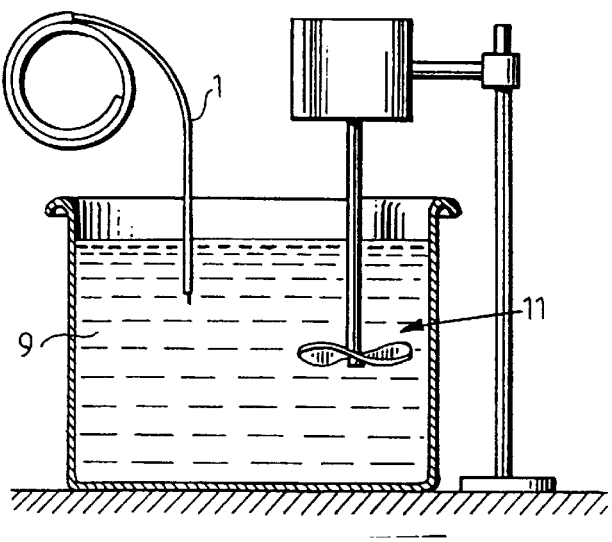
FIG. 3 illustrates the treatment of the end surface of the fibre.

In FIG. 1 the end of an optical fibre 1 is shown. It comprises as conventional a fibre core 3, a cladding 5 surrounding the core and an exterior protective layer 7. For conventional quartz glass fibres used for telecommunication, the core 3 and the cladding 5 consist of quartz glass having refractive indexes of different magnitudes, produced by suitable dopings, and the exterior protective layer is made of some polymer. In the production of an internal reflector first the exterior protective layer 7 is removed over a suitable distance from one end of the fibre. The end of the fibre is then submerged in a vessel 9, see FIG. 3, containing an etching liquid in the shape of hydrofluoric acid diluted with water, possibly mixed with ammonium fluoride, $NH_4F$, during mixing by means of a mixer shown at 11. When the glass in the fibre is etched by means of one of the liquids mentioned, the higher doped fibre core 3 will be etched more rapidly than the cladding 5 which produces a pit or recess 13 in the end surface of the fibre, see FIG. 1. The pit 13 can be more or less well localized to the very fibre core 3, depending on the type of fibre. A continuous transition in the end surface between the region of the fibre core and the cladding region is however always obtained, also for step index fibres.

The end surface of the fibre 1 comprising the pit or recess 13 within the core region is then spliced to an end surface of another optical fibre. The splicing process is advantageously made as a fusioned welding, where the heating is accomplished in some way, such as by means of an electrical arch, which will be described hereinafter, by means of a laser beam, hydrogen gas flame, etc. Also a completely mechanical splice is conceivable, such as by means of aligned V-grooves in a suitable fixture.

The fibre 1 comprising the pit 13 in one end surface is thus inserted as one of the fibres in a fibre welding device, generally designed 15, some central parts of which being illustrated in FIG. 4. The fibre portion 1 is then attached in a guide in one chuck 17, which in the welding machine 15 is placed on some support 19. In the opposite chuck 17' a similar fibre 1' is placed, which in the conventional way is straightly cut but has not been treated for producing a pit 13. In the fibre welding machine 15 the electrodes 20 are activated by supplying high voltage thereto, whereby an electric arc is formed therebetween. It produces a heat development, so that the ends of the two fibres 1 and 1' melt, these ends being located, during the welding stage, rather close to each other. When the fibre ends have melted sufficiently, they can be pressed somewhat to each other, so that the melted material flows together and the fibre ends are welded to each other, after which the electric arch is turned off, by interrupting the voltage supply to the electrodes 20, and the splice produced is finally allowed to cool.

Figure 2:
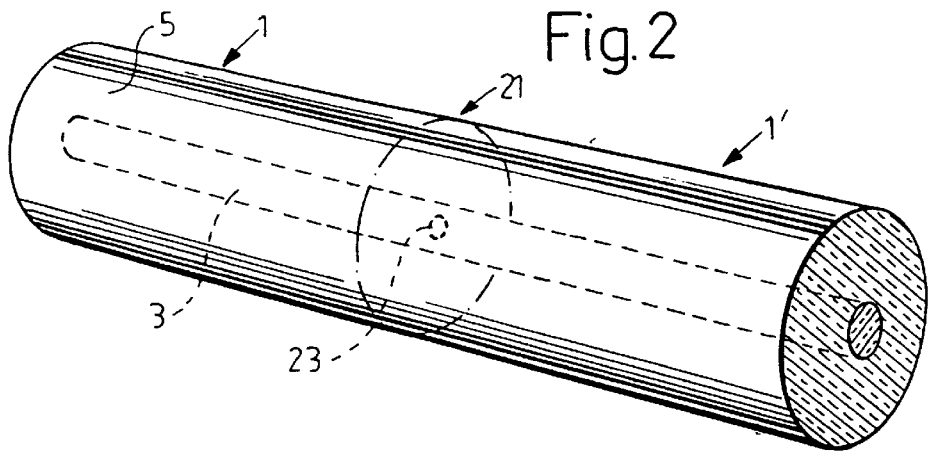
FIG. 2 shows a spliced fibre having an enclosed cavity.

A composite fibre is obtained, as is illustrated in FIG. 2, comprising the ends of the two fibres 1 and 1' welded to each other at the welding region 21. Owing to the pit 13 in the end of one of the fibres, after the welding a small air bubble or cavity 23 is formed in the fibre core in the splice-welded fibre. As has been possible to observe up to now, this bubble is completely enclosed in the fibre core and is in any case substantially always located within the core region, i.e. within the central region of the fibre where the refractive index varies and is different from the refractive index in the main portion of the fibre cladding 5. This air bubble 23 is a discontinuity in the fibre core and operates as a reflector or mirror for an electromagnetic wave transmitted in the optical fibre.

The resulting bubble 23 must have such a size that it affects the radiation field of a light wave that propagates along the optical fibre. It means that its dimension generally should be of the same magnitude of order as the diameter of the fibre core and that its smallest cross-measure, usually equal to its width as seen in the longitudinal direction of the fibre, e.g. must exceed 1/5 or 1/10 of the core diameter. Further the cavity should not disturb the light wave too extensively, since in most cases it is desirable that the light wave also continues forwards in the fibre, even if it has a reduced intensity.

The size of the resulting bubble 23 and thereby the magnitude of a reflection against the bubble 23 can to a certain extent be varied, after having welded the fibres 1 and 1' to each other, by performing further heating steps to the melting state or near melting state of the welded splice, e.g. by means of an electrical arc in the welding device 15. In the further heating operations also the dimensions of the enclosed bubble is reduced more and more and then also the reflectance or alternatively the attenuation.

An air bubble 23 produced in that manner at the core region causes reflections for light having different wave lengths. It has up to now been possible to vary the reflectance from −20 dB and downwards by a variation of the production conditions.

A method of increasing the reflectance owing to the enclosed air bubble 23 can be to fill, before splicing the fibre ends, the etched pit 13 with substance other than air. An example thereof is illustrated in FIGS. 5 and 6. In FIG. 5 thus a section is shown of a fibre end having an etched pit 13, where a metal layer 25 is deposited all over the end of the fibre, i.e. in particular over the perpendicularly cut, flat end surface and over the pit 13. This layer 25 can be a metal layer which has been coated by means of some deposition method such as evaporation. Thereafter most of this layer 25 is removed over the end surface of the fibre, as is illustrated of the sectional view of FIG. 6. If the end surface of the fibre is thus polished in a suitable way, metal material will remain in the pit 13 but not on the other portions of the end surface. Material 27 that is left in the pit 13 will increase the reflections in the finished fibre, which is then, in the same way as above, obtained by welding the end of the fibre 1 to another optical fibre having no particularly treated end surface.

In FIG. 7 it is schematically shown how an optical fibre 1, 1' produced in this way comprising an enclosed air bubble or discontinuity can be used for checking the operation of a fibre optical network, compare the International Patent Application having publication No. WO 90/06498. A control and monitoring unit 29, which e.g. can utilize OTDR (Optical Time Domain Reflectometry), is in a suitable way coupled to a main line 31 in an optical fibre network. The main line 31 is further connected to an optical coupler 33, from which individual branch lines 39 extend. In each branch line 35 a welded assembly is connected consisting of spliced fibres 1, 1' comprising a reflector 21 made in the splice. The control and monitoring unit 29 emits light pulses into the main line 31, which are distributed further to the branch lines 35. The emitted light is refractive against the reflectors in the fibre assembles 1, 1' and the control and monitoring unit 29 detects the returning light. If the reflectors 21 are located at different optical distances from the control and monitoring unit 29 the reflections from the different branch lines 35 can be distinguished. If an interrupt is obtained in some branch line 35, the earlier reflection from the reflector 21 in this branch line will cease and thereby it is possible to decide which one of the connected branch lines 35 is faulty or incorrect. In this case the control and monitoring unit 29 can output an alarm or suitable signal for indicating that the branch line in question has been detected to be in error.

What is claimed is:

1. An optical fiber for telecommunication comprising:
    a fiber core,
    a cladding surrounding the fiber core, and
    a reflector formed by a cavity in the optical fiber for reflecting light propagating in a first direction along the optical fiber, the reflected light propagating along the optical fiber in a second direction opposite the first direction, wherein a substance is disposed in the cavity for increasing the reflective capability of the cavity for light waves propagating in the optical fiber.

2. The optical fiber of claim 1, wherein the cavity is located within the fiber core of the optical fiber.

3. The optical fiber of claim 1, wherein the cavity is shaped to have one of substantially a lens shape and substantially a flattened ellipsoidal body shape, having two opposing large curved or arched surfaces, and wherein material in the fiber core extends up to at least a central part of one of the opposing large surfaces.

4. The optical fiber of claim 1, wherein the substance has a refractive index different from the refractive index of material in the optical fiber enclosing the cavity.

5. The optical fiber of claim 1, wherein the substance has substantially a solid shape.

6. The optical fiber of claim 5, wherein the substance is coated on only one surface in the cavity.

7. The optical fiber of claim 1, wherein the substance is a metal.

8. A method of producing a reflector in an optical fiber for telecommunication having a core enclosed by a cladding, the reflector reflecting light propagating along the optical fiber in a first direction to a second direction opposite the first direction, the method comprising the steps of:

forming a recess on a first end surface of a first piece of an optical fiber, the first end surface being substantially perpendicular to an axis of the first piece of optical fiber, and joining the first end surface to a second end surface of a second piece of an optical fiber, the second end surface being substantially perpendicular to an axis of the second piece of optical fiber wherein a cavity enclosed by the first end surface and the second end surface is provided, the cavity forming the reflector.

9. The method of claim 8, wherein the first end surface is joined to the second end surface by melting the end surfaces.

10. The method of claim 8, wherein the first end surface is joined to the second end surface by welding the first end surface to the second end surface.

11. The method of claim 8, wherein the step of forming the recess on the first end surface includes forming the recess only within a region that corresponds to an end surface of the fiber core.

12. The method of claim 8, wherein the step of forming the recess on the first end surface includes chemically treating the first end surface.

13. The method of claim 12, wherein the first end surface is chemically treated with one of hydrofluoric acid and or a mixture of hydrofluoric acid with ammonium fluoride.

14. The method of claim 8, wherein the step of forming the recess on the first end surface includes etching the first end surface.

15. The method of claim 14, wherein the first end surface is etched with a substance having different etching velocities for the material in the core in the first piece and the material outside the core in the first piece.

16. The method of claim 8, further comprising the step of introducing a substance in the cavity, which substance is selected to increase a reflective capability of the cavity to light waves propagating along the optical fiber.

17. The method of claim 16, wherein the step of introducing a substance in the cavity includes selecting the substance to have a refractive index different from the refractive index of the material in the first optical fiber piece and in the second optical fiber piece surrounding the cavity.

18. The method of claim 16, wherein the step of introducing a substance in the cavity is performed by introducing a metal material in the cavity.

19. The method of claim 16, wherein the step of introducing a substance in the cavity is performed by introducing the substance in the recess before joining the first end surface to the second end surface.

20. The method of claim 8, further comprising the steps, before joining the first end surface to the second end surface, of coating the first end surface with a layer of a substance to increase a reflective capability of the cavity for light waves propagating in the optical fiber, and then grinding the coated first end surface to a flat shape so that the layer is removed everywhere on the end surface except in the recess.

21. The method of claim 20, wherein the step of coating the first end surface with a layer of a substance includes selecting the substance to have a refractive index different from the refractive index of the material in the first optical fiber piece and in the second optical fiber piece surrounding the cavity.

22. The method of claim 20, wherein the step of coating a substance over the first end surface is performed by coating with a metal material.

23. The method of claim 8, wherein the first end surface is joined to the second end surface by melting the end surfaces to each other so that a joint forms, and further comprising the step, after joining the first end surface to the second end surface, of heating the joint to a temperature near the melt temperature of the materials in the fiber pieces for reducing the reflective capability of the produced reflector.

24. An optical fiber network having a main line and several branch lines connected thereto, comprising:

a monitoring unit connected to the main line, a plurality of optical fiber pieces, each piece including a fiber core, a cladding surrounding the fiber core and a reflector, one optical fiber piece being placed in each branch line, the reflectors being located at different optical distances from the monitoring unit for reflecting light propagating from the monitoring unit along the optical fiber pieces back through the respective optical fiber piece to the monitoring unit, the monitoring unit having means to detect light reflected from the reflectors and to indicate when reflected light from a reflector is not detected, the reflector of at least one optical fiber piece being formed by a cavity in the at least one optical fiber piece.

25. The optical fiber network of claim 24, wherein the cavity is located in the fiber core of the at least one optical fiber piece.

26. The optical fiber network of claim 24, wherein the cavity is located in a position so that light which propagates along the fiber is disturbed by the cavity, so that the light is partly reflected.

27. The optical fiber network of claim 24, wherein material in the fiber core extends up to the cavity.

28. The optical fiber network of claim 24, wherein that the cavity is substantially completely enclosed by material of the fiber core.

29. The optical fiber network of claim 24, wherein the cavity is shaped to have one of substantially a lens shape and substantially a flattened ellipsoidal body shape, having two opposite large curved or arched surfaces, and wherein material in the fiber core extends up to at least the central part of one of the opposite large surfaces.

30. The optical fiber network of claim 24, wherein a substance is disposed in the cavity for increasing the reflective capability of the cavity for light waves propagating in the optical fiber piece.

31. The optical fiber network of claim 30, wherein the substance has a refractive index different from the refractive index of material in the optical fiber piece enclosing the cavity.

32. The optical fiber network of claim 30, wherein the substance has substantially a solid shape.

33. The optical fiber network of claim 32, wherein the substance is coated only on one surface in the cavity.

34. The optical fiber network of claim 33, wherein the substance is coated only on that surface in the cavity which is directed towards a portion of the fiber core which is interrupted by the cavity.

35. The optical fiber network of claim 30, wherein the substance is a metal.

* * * * *